United States Patent [19]

Rögelein

[11] Patent Number: 4,820,948
[45] Date of Patent: Apr. 11, 1989

[54] ELECTRIC MOTOR

[75] Inventor: Dieter Rögelein, Stuttgart, Fed. Rep. of Germany

[73] Assignee: Johnson Electric Industrial Manufactory Limited, Chaiwan, Hong Kong

[21] Appl. No.: 63,020

[22] Filed: Jun. 17, 1987

[30] Foreign Application Priority Data

Jun. 18, 1986 [GB] United Kingdom ................ 8614834

[51] Int. Cl.⁴ .............................................. H02K 5/16
[52] U.S. Cl. ...................................... 310/90; 384/135; 384/478
[58] Field of Search ................... 310/89-91; 384/135, 478

[56] References Cited

U.S. PATENT DOCUMENTS

| | | | |
|---|---|---|---|
| 1,978,739 | 10/1934 | Brittian, Jr. ............................ | 384/478 |
| 2,483,013 | 9/1949 | Kopprasch ......................... | 384/135 X |
| 3,013,167 | 12/1961 | Bobula .................................. | 310/90 |
| 3,188,153 | 6/1965 | Turk ...................................... | 384/135 |
| 3,624,434 | 11/1971 | Dafler .................................... | 310/90 |
| 3,760,209 | 9/1973 | Hult .................................. | 310/90 X |
| 3,789,251 | 1/1974 | King ................................. | 310/90 X |
| 3,794,869 | 2/1974 | Apostoleris ........................... | 310/90 |
| 4,198,584 | 4/1980 | Otto ...................................... | 310/90 |
| 4,362,342 | 12/1982 | Bushor et al. ..................... | 310/90 X |
| 4,649,306 | 3/1987 | Yamashita ............................ | 310/90 |

FOREIGN PATENT DOCUMENTS

| | | |
|---|---|---|
| 56-29439 | 3/1981 | Japan . |
| 60-32543 | 6/1985 | Japan . |
| 0278860 | 10/1927 | United Kingdom ................ 384/135 |
| 269206 | 10/1927 | United Kingdom . |
| 377698 | 7/1932 | United Kingdom . |
| 379578 | 9/1932 | United Kingdom . |
| 777490 | 6/1957 | United Kingdom . |
| 1158797 | 7/1969 | United Kingdom . |
| 2155119 | 2/1985 | United Kingdom . |

Primary Examiner—Mark O. Budd
Attorney, Agent, or Firm—Fleit, Jacobson, Cohn & Price

[57] ABSTRACT

A d.c. electric motor has an oil collector located fast on a motor shaft, between a lubricated bearing and a commutator. Collector is of rubber and forms an oil tight seal with the motor shaft so that oil will migrate into a ring portion where the centrifugal force of the rotating motor will retain the oil in the ring. Preferably the collector has an oleophobic coating thereon.

11 Claims, 1 Drawing Sheet

ELECTRIC MOTOR

INTRODUCTION

The present invention relates to an electric motor, and in particular to an electric motor incorporating a commutator and means for preventing bearing lubricant from contaminating the commutator.

BACKGROUND

In small, fractional horsepower, permanent magnet direct current motors a commutator typically comprises a number of copper segments laid on a cylindrical support. The segments are spaced apart by a small amount, so that there is a gap between adjacent segments. As a brush in contact with the commutator segment wears down, particles of carbon become embedded in the gaps. As the motor rotates these may be thrown off centrifugally. However it has been found that when using a low viscosity oil for lubricating bearings in such motors, the oil migrates from the bearing on to the commutator segments. This oil then mixes with the carbon particles to hold them in the gaps between the segments, which eventually produces an electrical short between the segments causing a breakdown or loss in efficiency of the motor. This may happen in particular when using low viscosity oils suitable for low temperature applications, for example automobiles.

It has been known to provide washers on the motor shaft between the bearing and commutator to throw the oil radially away from the shaft but these are not entirely satisfactory. GB777490 shows a system in which oil is thrown radially outwards by a cup-shaped collar into a circumferential collector mounted fast on the motor housing, the oil draining back to the bearing, but this requires the addition of several parts where space is at a premium in small motors.

SUMMARY OF THE INVENTION

The present invention provides an electric motor comprising a shaft carrying a commutator having electrically conducting segments, the shaft being rotatably mounted in a lubricated bearing, and means mounted on the shaft for collecting lubricant which migrates from the bearing towards the commutator, to prevent the lubricant migrating on to the commutator segments.

Preferably the collecting means comprises a ring which is mounted about the shaft, the ring being concave towards the shaft and being mounted between the segments and the bearing.

Preferably the ring is formed on a disc which is mounted on the shaft and forms a lubricant tight seal with the shaft, the ring and disc having a generally C-shaped cross-section which is concave towards the bearing.

Other features and advantages of the invention will be apparent from the following detailed description.

BRIEF DESCRIPTION OF THE DRAWINGS

FIG. 1 illustrates a permanent magnet d.c. motor of the type made and sold by the applicants under catalogue number HC355 but embodying the improvement of the present invention.

DESCRIPTION OF THE PREFERRED EMBODIMENTS

Figure 1:
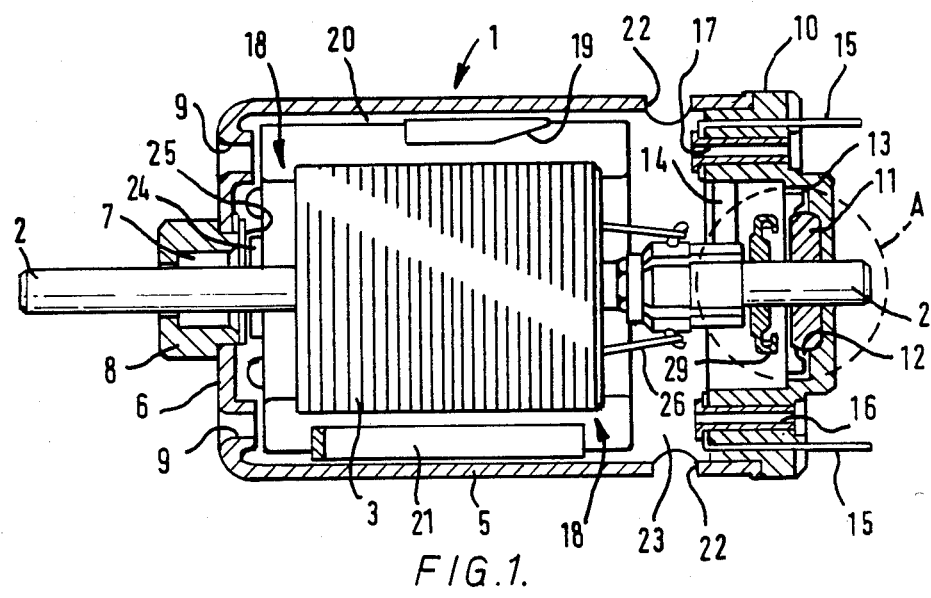
FIG. 1 is a longitudinal cross-section through a permanent magnet d.c. motor embodying the invention.

Referring to FIG. 1, a small, fractional horsepower permanent magnet direct current motor 1 is illustrated. The motor comprises a motor shaft 2 which carries a wound armature 3 and commutator 4. The commutator 4 and armature 3 are mounted fast on the shaft and the armature is wound and connected to the commutator in the manner generally known in the art. Tangs 23 on the commutator are forged to wires 26 which form the coil windings of the armature.

The shaft 2 is mounted in a cylindrical metal casing 5. Casing 5 is closed at one end by an integrally formed end plate 6. End plate 6 carries a bearing 7 in a housing 8, the shaft 2 being journalled in the bearing 7. A brass collar 24 is a force fit on the shaft 2 to limit the axial movement of the shaft through bearing 7. A washer 25 is mounted on the shaft between the brass collar 24 and bearing 7.

End plate 6 has a plurality, typically 4, of circumferentially extending slots 9 for ventilation of the inside of the motor.

A plastics end cap 10, typically of nylon, houses a self aligning sintered bearing 11 which is held in place by axially extending tabs 12 of a washer 13 which is pressed into the end cap. The end cap supports brush gear comprising a pair of carbon brushes 14 (one is seen in FIG. 1) which are urged against the commutator 4 by brush leaves (not seen in FIG. 1) which are connected to power supply tags 15.

The brush leaf/tag assemblies are held on the end cap 10 by rivets 16, 17.

In the example shown the casing 5 carries two permanent magnets 18, which each bear at one axial edge 20 against a respective tang 19 and are urged apart at their other axial edges by a U' shape spring 21.

Circumferentially extending slots 22 are provided in the casing 5 in the region between the brushes 14 and armature 3 for ventilation.

The improvement provided by the present invention resides in the provision of collector in the form of a rubber collar 29 on the shaft 2, between the bearing 11 and commutator 4.

Figure 2:
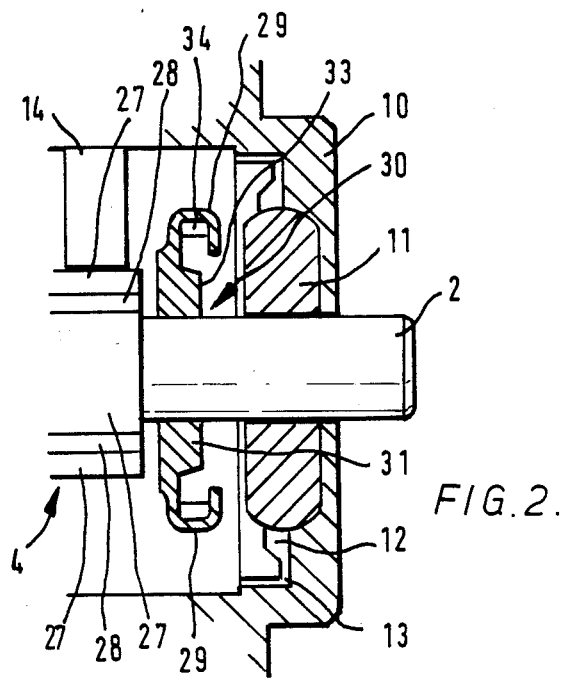
FIG. 2 is an enlarged view of part of the motor of FIG. 1 enclosed by circle A.

Referring to FIG. 2, the commutator 4 comprises a plurality of copper segments 27 which are laid on a support 28 which is fast with the shaft 2. It will be appreciated that other types of commutator construction are known in the art and the present invention is not limited to use with any particular type. A gap 28 is formed between the segments 27, to isolate electrically the adjacent segments.

As the segments 27 rotate past brush 14, carbon particles from the brush become embedded in the gaps 28.

In prior art designs it has been found that oil from bearing 7 will seep or migrate along the shaft 2 onto the segments 27. This oil mixes with the carbon particles to cause them to stick in the gaps 28, eventually shorting adjacent segments 27.

In accordance with an embodiment of the present invention a rubber collar 29 is mounted on the shaft 2. Collar 29 is of rubber, or other elastic material, so that it may be stretched to fit on the shaft 2, forming an oil tight joint 30 with the shaft 2. A disc portion 31 extends radially away from the shaft and supports a ring 32 which is concave to the shaft, the overall appearance of the collar 29 being C-shape in cross-section as seen in FIG. 2.

The collar 29 is axially symmetric about the shaft 2.

Oil which migrates along shaft 2 from the bearing 11, will migrate across the facing surface 33, into the concavity of ring portion 32. Under rotation of the shaft 2, the oil will be trapped in the outer ring portion 32, as indicated by reference numeral 34.

It will be appreciated by those in the art that the quantity of oil 34 is very small, being a fraction of the oil impregnated in bearing 11 on assembly of the motor.

The invention is not limited to use with sintered bearings, such as bearing 11, and is equally applicable to other types such as ball or roller bearings.

The rubber collar 29 will form a high friction surface if it bears against the bearing 11. It is therefore preferable to incorporate a degree of end loading in the motor, in the direction of bearing 7. This can be achieved by the positioning of the magnets 18, as is known in the art.

In a particularly preferred modification the collar 29 has an oleophobic surface which inhibits the migration of oil across the surfaces of the collector 29. Such a surface may be formed by coating with an oleophobic substance such as that marketed by the Japanese company Sumitomo under the trade name "Sumiflunon".

An oil collector may also be provided between bearing 7 and commutator 4 if desired.

Various modifications will be apparent to those in the art and it is desirable to include all such modifications as fall within the scope of the accompanying claims.

What is claimed is:

1. An electric motor comprising a shaft carrying a commutator having electrically conducting segments, the shaft being mounted in a lubricated bearing, and an oil collector mounted on the shaft between the commuator and the bearing, wherein the oil collector comprises a disc portion mounted fast on the shaft, the disc portion extending radially away from the shaft and having a surface facing the bearing, and a U-shaped cross-section ring portion integral with an outer periphery of the disc portion and extending around the shaft, the U-shaped cross section ring portion being concave in relation to a portion of the shaft between the commutator and the bearing, and forming collector means for collection of lubricant which migrates along the shaft from the bearing and spreads across the facing surface of the disc portion, the collector means being located at a radial distance from the shaft.

2. An electric motor is claimed in claim 1, wherein the U-shaped cross-section ring portion is defined by a first radially extending annular portion which is contiguous with the disc portion, and a second radially extending annular portion parallel to the first annular portion, the annular portions being joined by a generally cylindrical portion to form the U-shaped cross-section ring, the inner diameter of the second annular portion being of a diameter less than the outer diameter of the bearing.

3. An electric motor as claimed in claim 2, wherein the surface of the disc portion facing the bearing is located in a plane which is between the first and second annular portions.

4. An electric motor as claimed in claim 2, wherein the oil collector has an oleophobic surface.

5. The improvement as claimed in claim 3, wherein the C-shaped cross-section member comprises a disc portion mounted on the shaft and extending radially away from the shaft, said disc portion having a central boss extending towards the bearing, and an annular ring integral with an outer periphery of the disc portion, said annular ring having a U-shaped radial cross-section, one arm of the U shape being contiguous with the disc portion and the outer arm of the U shape defining the said mouth of the concavity.

6. A motor as claimed in claim 5, wherein the oil collector has an oleophobic surface.

7. A motor as claimed in claim 5, wherein the oil collector is of elastic material.

8. A fractional horsepower permanent magnet direct current motor comprising a metal casing housing a permanent magnet stator, an end cap mounted on the casing and carrying brushgear, a rotor rotatably mounted in bearings in the casing and end cap, the rotor comprising a wound armature and a commutator mounted fast on a shaft which is received in the bearings, and an oil collector mounted on the shaft between the commutator and one of said bearings, the oil collector extending around the circumference of the shaft and forming an oil tight seal therewith, the oil collector having a disc portion extending away from the shaft and a ring portion at an outer periphery of the disc portion, the ring portion being U-shaped in radial cross-section and concave towards a portion of the shaft between the oil collector and the bearing, the ring portion thereby providing collector means for collecting oil which migrates along the shaft from the bearing towards the commutator and across the disc portion, said collector means being radially spaced from the shaft.

9. A motor as claimed in claim 8, wherein the oil collector is of elastic material.

10. A motor as claimed in claim 9, wherein the oil collector has an oleophobic surface.

11. A motor as claimed in claim 9, wherein an innermost periphery of the ring portion has a diameter less than an outer diameter of the bearing.

* * * * *